May 3, 1966  B. A. ALPER ETAL  3,248,805
READING PACER
Filed Sept. 30, 1963  2 Sheets-Sheet 1

INVENTORS.
BENJAMIN A. ALPER
DANIEL J. CONROY, JR.
BY Byron, Hume, Groen & Clement
Attorneys.

United States Patent Office 3,248,805
Patented May 3, 1966

3,248,805
READING PACER
Benjamin A. Alper, Glenview, Ill., and Daniel J. Conroy, Jr., Jacksonville, Fla., assignors to Americana Interstate Corp., Mundelein, Ill., a corporation of Illinois
Filed Sept. 30, 1963, Ser. No. 312,553
4 Claims. (Cl. 35—35)

This invention relates to a device for improving reading speed, and more particularly, to a reading pacer having a pacer bar which is adapted to pass over successive portions of reading material at a predetermined adjustable rate of speed.

It is an object of the present invention to provide a reading pacer with a pacer bar, the pacer bar being adapted to pass over successive portions of reading material at a predetermined, variable rate of speed.

It is another object of the present invention to provide a reading pacer with a pacer bar wherein the rate of speed of the pacer bar may be accurately set over a wide range of reading rates.

It is a further object of the present invention to provide a compact, light-weight, and inexpensive reading pacer.

It is yet another object of the present invention to provide a reading pacer having compact means for easily and simply changing the rate of speed of the pacer bar thereof.

It is still another object of the present invention to provide a reading pacer having a pacer bar that may be easily returned to its initial position after having passed over a page, column or the like of reading matter.

The invention, both as to its organization and method of operation, taken with further objects and advantages thereof, will best be understood by reference to the following description taken in connection with the accompanying drawings, in which.

Figure 1:
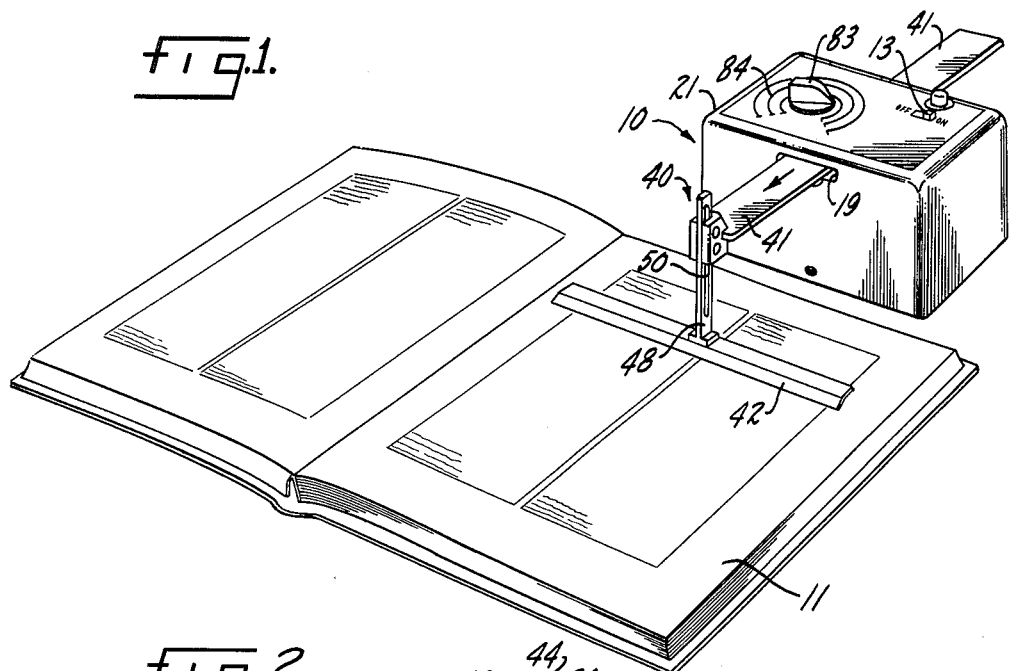
FIGURE 1 is a perspective view of a reading pacer embodying the features of the present invention as employed with reading material to improve reading speed.

Referring now to the drawings, and more particularly to FIGURE 1, there is illustrated a reading pacer employing the features of the present invention and indicated generally by the reference numeral 10. The reading pacer 10 has a pacer bar 42 which is adapted to move down a page of reading matter, in this instance a book 11, at a predetermined rate of speed so that the reader is forced to read at a rate equal to or greater than the rate at which the pacer bar 42 traverses the page of the book 11. The reading pacer 10 may, of course, also be used with magazines or any other suitable reading material. The rate of speed of the pacer bar 42 may be varied as desired by movement of the control knob 83, as will be more apparent hereinafter. After the pacer bar 42 has moved the length of the page of the book 11 it is manually pushed back to the point where it will be at the top of the next page, which is placed under the pacer bar 42. The pacer bar 42 will then traverse the page. The reading pacer 10 is turned on and off by an on-off switch 13 such as is well known in the art.

The reading pacer 10, referring to FIGURES 1–4, comprises a housing indicated generally by reference numeral 20, a pacer arm assembly indicated by reference numeral 40, and a driving assembly indicated generally by reference numeral 60. The driving assembly 60 is mounted in the housing 20 and is adapted to drive the pacer bar assembly 40 at a predetermined rate of speed over selected reading matter.

Figure 3:
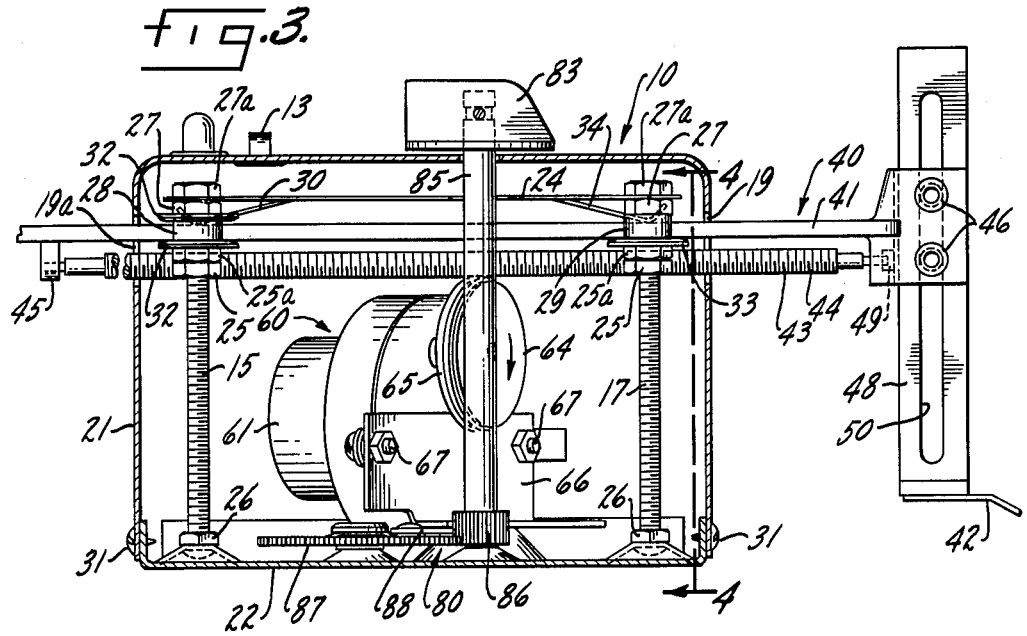
FIGURE 3 is a cross-sectional view of the reading pacer of FIGURE 1 taken along lines 3—3 of FIGURE 2.

The housing 20 comprises a cover member 21 and a base member 22. The base member 22 fits into an opening in the bottom of the cover member 21 and is attached to the cover member 21 by means of screws 31 or other suitable means. The cover member 21 and the base member 22 may be made of metal, plastic, or other suitable material. Attached to the base member 22 are two upwardly extending back support members 15 and 16 and two upwardly extending front support members 17 and 18 which are adapted to support the pacer bar assembly 40. In this instance, the support members 15, 16, 17 and 18 are bolts which extend through a hole in each of four recessed portions of the base member 22. Each support member 15, 16, 17 and 18 has a nut 26 securing the respective support member to the base member 22. Each of the back support members 15 and 16 has a rotatably mounted guide member 28 which is adapted to position and guide the pacer bar assembly 40. The guide members 28 are positioned at the same height above the base member 22 and each are rotatably mounted on the back support members 15 and 16, respectively, by nuts 25, 25a, 27 and 27a. The guide members 28 are spool-shaped members having a spaced pair of annular flanges 32 (FIGURE 3). The guide members 28 may be made of metal, such as aluminum, steel or the like, plastic, such as Teflon, nylon, or the like, or other suitable material. Each of the front support members 17 and 18 has a rotatably mounted guide member 29 which is adapted to position and guide the pacer bar assembly 40. The guide members 29 are positioned at the same height above the base member 22 as the guide members 28 and each is rotatably mounted on the front support members 17 and 18, respectively, by nuts 25, 25a, 27 and 27a. The guide members 29 are annular members having a single annular flange 33. The guide members 29 may be made of the same materials mentioned above with respect to the guide members 28.

The position of the guide members 28 and 29 may, of course, be altered by the nuts 25, 25a, 27 and 27a. The support members 15, 16, 17 and 18 may be rods, tubes or the like, instead of threaded bolts, and many other suitable means may be employed, as will be readily apparent to one with ordinary skill in the art, to pivotally mount the guide members 28 and 29.

Figure 4:
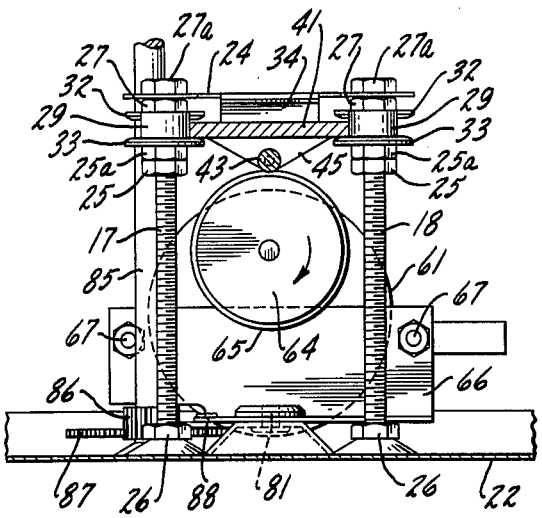
FIGURE 4 is a cross-sectional view of the reading pacer of FIGURE 1 taken along lines 4—4 of FIGURE 3 with the driving assembly having been pivoted so that the pacer bar does not move.

The support members 15, 16, 17 and 18 also support a frame member 24 which, in this instance, is made of spring steel. The frame member 24 is attached to the support members 15, 16, 17 and 18 by the nuts 27 and 27a on each of these support members. The frame member 24 has a front, longitudinally extending flap member 34 and a back longitudinally extending flap member 30. Each of the flap members 30 and 34 acts as springs on the pacer bar assembly 40 by asserting a small downward force on the pacer bar assembly 40 and thereby assisting to maintain it in engagement with the driving assembly 60. To these ends, as seen in FIGURES 3 and 4, the free ends of the flap members 30 and 34 engage the top of an extension arm 41 of the pacer bar assembly 40. The frame member 24 strengthens the structure formed by the four support members 15, 16, 17 and 18 while also acting as a spring upon the pacer bar assembly. The frame member 24 may be made of any suitable spring material such as spring steel, brass, plastic or the like.

The pacer bar assembly 40 extends through openings 19 and 19a in the front and back, respectively, of the cover 21 and is adapted to be driven by the driving assembly 60 forwardly from the front of the housing 20 as indicated by the arrow in FIGURE 1. In this manner, the pacer bar 42 of the pacer bar assembly 40 moves down the page of reading material forcing the reader to read at a rate equal to or greater than the speed of the pacer bar 42. Once the pacer bar 42 has traversed the page of reading material the pacer bar assembly 40 is moved back manually and begins its forward movement again after being released. To these ends, the pacer bar assembly 40 comprises the extension arm, 41, a friction member 43, the pacer bar 42, and a connecting member 48. The pacer bar 42, which is adapted to traverse a page of reading material at a pre-determined selected rate, is attached by a screw (not shown) or other suitable means to the connecting member 48 which, in turn, is connected to the front end of the extension arm 41. The connecting member 48 is attached to the extension arm 41 by two rivets 46 secured to the forward end of extension arm 41 and passing through a slot 50 in connecting member 48. This manner of connection allows connecting means 48 to be slidably disposed with respect to the extension arm 41 within the limits of slot 50. By moving connecting member 48 upward or downward, the height of pacer bar 42 may be adjusted to any thickness of reading material. An annular-shaped spring 47, which is mounted on one of the rivets 46 between the connecting member 48 and the extension arm 41, creates sufficient friction on the connecting member 48 so that the pacer bar 42 will remain in the position to which it is adjusted. A myriad of means may be employed to attach the connecting member 48 to the extension arm 41 in such a manner that the height of the pacer bar 42 may be adjusted as desired and the selection of suitable means to effect these ends would be within the ordinary skill of one in the art.

The extension arm 41 rests upon the flanges 33 of the guide members 29 and the bottom flanges 32 of the guide members 28 and is in this manner supported and positioned by the guide members 28 and 29. Because the extension arm 41 extends between the flanges 32 on the guide members 28, both upward and downward movement of the extension arm 41 is limited by guide members 28, whereas the guide members 29 do not limit upward movement of the extension arm 41. This enables the forward end of extension arm 41 to be lifted slightly, allowing disengagement of the friction member 43 from the driving assembly 60 during the manual return of pacer bar assembly 40 as will be more apparent hereinafter. The pacer bar assembly 40 may be completely removed from the housing 20 for convenience in storage or shipping. For convenience of operation and to enhance the overall light weight of the reading pacer, the pacer bar assembly 40 is preferably constructed of materials such as plastic, aluminum or other suitable materials.

The friction member 43 is a rod rotatably mounted on the underside of the extension arm 41 by suitable bearings 45 and 49. The surface 44 of the friction member 43 is threaded, which increases the effective friction of the surface 44. Friction member 43 is mounted parallel to the direction of motion of the pacer bar assembly 40 and moves with the entire pacer bar assembly 40. The bearings 45 and 49 permit the friction member 43 to simultaneously rotate about an axis parallel to the direction of motion of pacer bar assembly 40, whereby the resistance to motion of the pacer bar assembly 40 is considerably reduced, as will be more apparent hereinafter. The particular bearings 45 and 49 employed is a matter of choice within the ordinary skill of one in the art.

Although it is preferred that the friction member 43 be rotatable so that the pacer arm assembly 40 is most easily driven, the friction member 43 may be non-rotatably attached to the extension arm 41 and may be an integral part of the pacer bar assembly 40 and have a flat surface or the like, rather than a cylinder surface. Furthermore, the surface 44 of friction member 43 need not be threaded, though this is preferable.

The driving assembly 60 supplies the motive force for the pacer bar assembly 40 and includes a motor 61 having a drive shaft with a friction drive wheel 64 fastened thereto by suitable means (not shown), such as a set screw or the like. The motor 61 is a constant speed electric motor of low power and reasonably low drive shaft speed. The motor 61 has a line cord connection 62 which is connected to a standard electrical outlet (not shown), though the motor 61 may be adapted to be battery operated, if so desired.

The friction drive wheel 64 is constructed of metal, plastic, or other suitable material. A rubber or soft plastic O-ring 65 is mounted on the periphery of the friction drive wheel 64. The O-ring 65 of the drive wheel 64 engages the friction member 43 and, in this manner, the driving assembly 60 moves the pacer arm assembly 40. The use of the O-ring 65 is advantageous because, if it becomes worn, it may be readily replaced. Furthermore, because the O-ring 65 is made of a resilient plastic material, such as rubber, it will firmly grip the surface 44 of the friction member 43 and assure positive driving of the pacer bar assembly 40, i.e., the coefficient of friction between the engaging elements is increased. Thus, the use of an O-ring member 65 is preferred. However, the O-ring 65 may be eliminated and the drive wheel 64 directly contact the friction member 43 so long as the frictional engagement between the periphery of the drive wheel 64 and the surface 44 of the friction member 43 is sufficient for the drive wheel 64 to drive the pacer bar assembly 40. This frictional engagement may be enhanced by knurling or otherwise roughening the periphery of the drive wheel 64. Likewise, the drive wheel 64 may be made of rubber or the like to improve this frictional engagement. The surface 44 of the friction member 43 may be smooth, knurled or the like, rather than threaded, depending upon the amount of frictional engagement required and/or desired between the driving assembly 60 and the pacer bar assembly 40.

The motor 61 with attached friction drive wheel 64 is secured to a vertical portion of an L-shaped bracket 66 by means of nuts and bolts 67 or other suitable means, such as rivets and the like. The bracket 66 has a horizontal portion with an aperture through which the bracket 66 is pivotally attached to the base 22 by a nut and bolt arrangement 81 including a plurality of plain washers between the base member 22 and the bracket 66. In this manner, the driving assembly 60 is pivotally mounted within housing 20. Numerous other mechanical techniques may be employed to pivotally mount the driving means 60 within the housing 20 as will be apparent to one with ordinary skill in the art.

Motor positioning means, indicated generally by reference numeral 80, is adapted to pivot the driving assembly 60 and thereby control the rate of speed of the pacer bar assembly 40. The motor positioning means 80 allows a fine control of the angular position of the driving assembly 60. To these ends, it includes a knob 83 with a pointer which cooperates with a printed dial 84 on the cover 21. The knob 83 is attached by a set screw or other suitable means to a pivotally mounted, vertical shaft 85 having a gear 86 fixedly secured thereto. The gear 86 meshes with a larger gear 87 which is rotatably attached to the base 22 by suitable means. A linkage arm 88 has one end pivotally attached by suitable means to the outer edge of the gear 87 and its other end pivotally attached by suitable means to the horizontal portion of the bracket 66. In this manner, when the knob 83 is turned the motor assembly 60 is pivoted and the angle between the longitudinal axis of the friction member 43 and the axis of rotation of the friction drive wheel 64 is changed. This changes the speed of the pacer bar 42 as will be more apparent hereinafter. Many other means may be employed to pivot the driving assembly 60 and the selection of the particular means to be employed is a matter of choice within the ordinary skill of one in the art.

The driving assembly 60 is intended to drive the pacer bar assembly 40 by virtue of the frictional engagement between the O-ring 65 of the friction drive wheel 64 and the friction member 43. The friction drive wheel 64 is located so that its O-ring member 65 is capable of continuous engagement with the friction member 43 throughout the length of travel of the pacer bar assembly 40. The O-ring member 65 of the friction wheel 64 engages the underside of friction member 43. The weight of the pacer bar assembly 40 is thus utilized to increase the pressure of contact between the friction member 43 and friction driving wheel 64. This decreases the likelihood of slippage. Furthermore, the force of the flap members 30 and 34 provides assurance that there will not be slippage between the friction member 43 and the O-ring member 65. A particular advantage of the use of a rotatable rod or cylinder for friction member 43 is that to a considerable extent the loss of energy due to sliding friction with consequent wear to the parts is virtually eliminated by allowing the friction member 43 to rotate about an axis parallel to the direction of movement of pacer bar assembly 40. In so doing, surface 44 of friction member 43 makes a rolling contact with the periphery 65 of friction driving wheel 64, rather than a partially sliding contact. This is enhanced by the use of substantially narrow area of contact, although the latter is not necessary.

Figure 2:
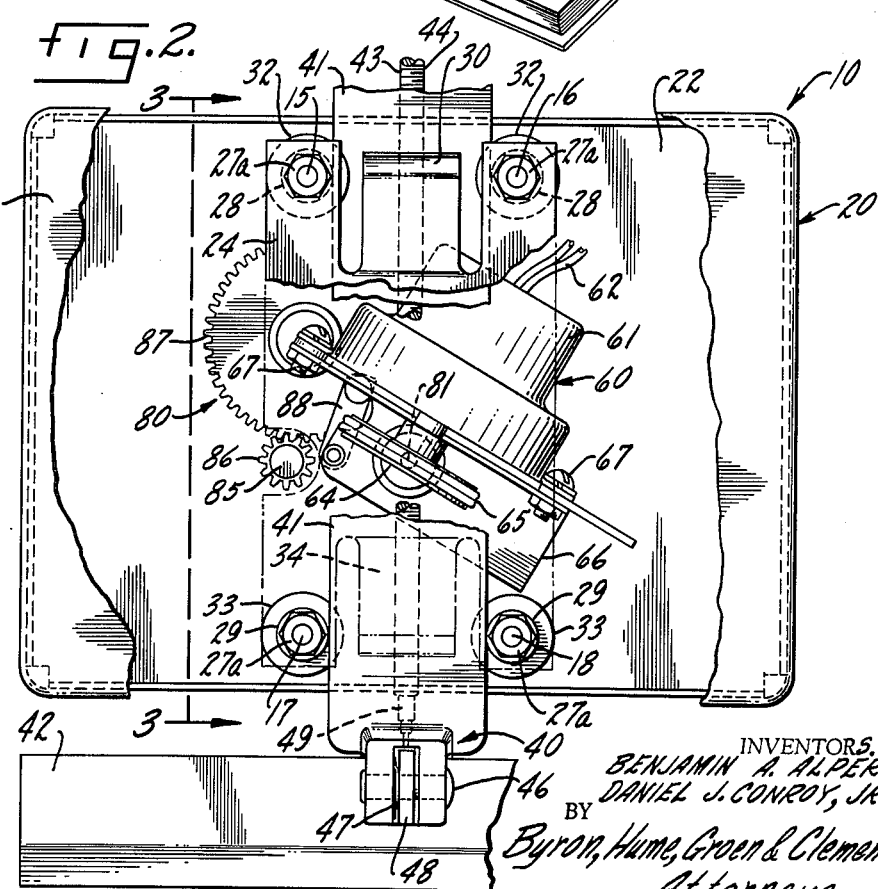
FIGURE 2 is a cut-away top view of the reading pacer of FIGURE 1.

The motor 61 is a constant speed motor. As the O-ring 65 of the friction driving wheel 64 engages the friction member 43, the friction driving wheel 64 urges the friction member 43, and therefore the pacer bar assembly, in the direction the friction drive wheel 64 is rotating. The force which is exerted on the friction member 43 may be thought of as divided into two components—one component urges the pacer bar assembly 40 to move forward and the other component urges the pacer bar assembly 40 to move transversely. These force or velocity components will change with respect to each other as the angle is varied between the longitudinal axis of the friction member 43 and the plane of rotation or axis of rotation of the friction drive wheel 64. When the plane of rotation of the friction driving wheel 64 is perpendicular to the longitudinal axis of the friction member 43, such as in FIGURE 4, there is no force exerted tending to move the friction member 43 forward and the pacer bar assembly 40 will remain stationary. Stated otherwise, when the axis of rotation of the drive wheel 64 is parallel to the longitudinal axis of the friction member 43, the pacer bar assembly 40 will not move. Transverse movement of the pacer bar assembly 40 is, of course, prevented by the guide members 28 and 29. However, when the driving assembly 60 is pivoted by turning the knob 83 so that the axis of rotation of the drive wheel 64 is not parallel to the longitudinal axis of the friction member 43 (and the plane of rotation of the drive wheel 64 is therefore no longer perpendicular to the longitudinal axis of the friction member 43) a force component will urge the pacer bar assembly to move forward, as seen in FIGURES 1–3. The maximum speed that can be obtained by the pacer bar assembly 60 occurs when the friction driving wheel 64 has been turned so that its plane of rotation is parallel to the longitudinal axis of the friction member 43 and the speed of the pacer bar assembly 40 becomes substantially the same as the peripheral speed of the friction driving wheel 64 with O-ring 65. Therefore, by varying the angular position of the friction driving wheel 64 with respect to the friction member 43 the speed of the pacer bar assembly 40 may be varied as desired within a wide speed range. Furthermore, the speed of the pacer bar assembly 40 may be changed without stopping the reading pacer 10.

The operation of the reading pacer 10 is quite simple. The reading pacer 10 is placed in position so that the pacer bar 42 is at the top of the page of the book 11 or other suitable reading material. The speed at which the operator desires the reading pacer 10 to traverse the page is selected by the movement of the knob 83 to the proper setting on the dial 84. The simplicity of this arrangement is especially important, as the reading pacer 10 is intended to be used by small children as well as adults. Also, the pivoting mechanism 80 enables the use of an easy-to-read linear dial 84. The pacer 10 is turned on after the motor 61 is plugged in an electrical outlet. The friction driving wheel 64 is thereby rotated and the pacer bar assembly 40 moves forward as shown in FIGURE 1. When the pacer bar 42 has traversed the page of the book 11, it may be reset without turning off the motor 61 by lifting the pacer bar assembly 40 slightly at its forward end and pushing it back toward housing 20. The guide members 29 are adapted to allow upward movement of extension arm 41. By lifting the pacer bar assembly 40 in this manner, the friction member 43 is disengaged from the O-ring 65 of the friction driving wheel 64 and wear on these parts is minimized. Once the pacer bar assembly 40 is released, the friction member 43 and the O-ring 65 of the wheel 64 again engage and the pacer bar assembly 40 will again move forward at the same rate of speed. The reading pacer is not damaged, however, if the operator merely pushes the pacer bar assembly 40, without lifting it, back to the top of the next page.

The reading pacer 10 of the present invention may be constructed in a very compact form since only the pacer bar assembly 40 need correspond in length to the reading material to be scanned. The size of the housing 20 is therefore determined principally by the size of the motor 61 and friction driving wheel 64, both of which may be quite small. The friction wheel 64 may have any desired thickness.

While the embodiment described herein is at present considered to be preferred, it is understood the various modifications and improvements may be made, and it is intended to cover in the appended claims all such modifications and improvements as fall within the true spirit and scope of the invention.

What is claimed is:

1. A reading pacer adapted to move a pacing indicator over reading material at a selected rate of speed, comprising a housing, a pacing indicator movably extending from said housing, said pacing indicator having a driving surface extending thereon, a constant speed motor mounted to said housing, a driving wheel connected to said motor and rotated about an axis of rotation thereby, said driving wheel having a frictional peripheral rotational surface frictionally engaging said driving surface on said pacing indicator to move said pacing indicator, and means on said housing for rotating said driving wheel so that the axis of rotation of said driving wheel is rotated with respect to said pacing indicator, whereby the speed of said pacing indicator is changed.

2. A reading pacer adapted to move a pacer bar over reading material at a controlled rate of speed, comprising a housing, a movable pacer bar assembly including a pacer bar a friction member and an extension arm, said friction member being a rotatable rod secured to said extension arm, driving means having a drive wheel frictionally engaging said rod, said driving means being pivotally mounted within said housing, and means for varying the angular position of said driving means with respect to said rod whereby the speed of said pacer bar assembly may be changed.

3. A reading pacer comprising a housing, driving means pivotally mounted in said housing, means for pivoting said driving means, a pacer bar assembly slidably mounted in said housing, said pacer bar assembly having one end extending from said housing and having a pacer bar attached to said one end, a friction member attached to said pacer bar assembly, said friction member being an externally threaded rod-shaped member rotatably attached to said pacer bar assembly and extending along a major portion of the length thereof, said driving means having a constant speed electric motor with a drive shaft, a friction drive wheel attached to said drive shaft, said friction drive wheel frictionally engaging said friction member, the pivotal position of said driving means with respect to said pacer bar assembly determining the rate of speed of said pacer bar.

4. A reading pacer comprising a housing, a pacer bar assembly and a driving means, said pacer bar assembly including an extension arm which extends through said housing, means in said housing for slidably supporting said extension arm, said means including rotatable guide members, one end of said extension arm having an adjustable pacer bar attached thereto, said pacer bar being adapted to traverse a page of reading material or the like, said extension arm being an elongate member having a friction member attached thereto, said friction member being a rotatably mounted, threaded rod extending substantially the length of said extension arm, said driving means including a constant speed electric motor having a shaft upon which is mounted a friction drive wheel, said electric motor being pivotally mounted, said friction drive wheel engaging said threaded rod, means to pivot said motor whereby the rate of travel of said pacer bar is varied by pivoting said motor so that the angle between the axis of rotation of said friction drive wheel and the longitudinal axis of said threaded rod is varied.

References Cited by the Examiner

UNITED STATES PATENTS

| 2,568,577 | 9/1951 | Alexander | 35—35.2 |
| 2,984,916 | 5/1961 | Balchuns | 35—35.2 |
| 3,148,459 | 9/1964 | Laurie | 35—35.2 |
| 3,161,969 | 12/1964 | Schaill | 35—35.2 |

FOREIGN PATENTS 859,135  1/1961  Great Britain.

EUGENE R. CAPOZIO, *Primary Examiner.*

LAWRENCE CHARLES, *Examiner.*

WILLIAM H. GRIEB, *Assistant Examiner.*